United States Patent
Tucker et al.

(10) Patent No.: US 10,480,552 B2
(45) Date of Patent: Nov. 19, 2019

(54) ACCUMULATOR WITH SECONDARY GAS CHAMBER

(71) Applicant: ClearMotion, Inc., Woburn, MA (US)

(72) Inventors: Clive Tucker, Charlestown, MA (US); Jason Steven Sirois, Atkinson, NH (US); Jack A. Ekchian, Belmont, MA (US)

(73) Assignee: ClearMotion, Inc., Billerica, MA (US)

(*) Notice: Subject to any disclaimer, the term of this patent is extended or adjusted under 35 U.S.C. 154(b) by 0 days.

(21) Appl. No.: 15/881,165

(22) Filed: Jan. 26, 2018

(65) Prior Publication Data

US 2018/0216639 A1    Aug. 2, 2018

Related U.S. Application Data

(60) Provisional application No. 62/451,618, filed on Jan. 27, 2017.

(51) Int. Cl.
| | |
|---|---|
| *F15B 21/045* | (2019.01) |
| *F15B 1/02* | (2006.01) |
| *F15B 1/24* | (2006.01) |
| *F15B 15/22* | (2006.01) |
| *B60G 17/08* | (2006.01) |
| *F16F 9/00* | (2006.01) |

(52) U.S. Cl.
CPC ............ *F15B 21/045* (2013.01); *B60G 17/08* (2013.01); *F15B 1/021* (2013.01); *F15B 1/025* (2013.01); *F15B 1/24* (2013.01); *F15B 15/228* (2013.01); *B60G 2202/413* (2013.01); *B60G 2202/416* (2013.01); *F15B 2201/205* (2013.01); *F15B 2201/31* (2013.01); *F15B 2201/32* (2013.01); *F15B 2201/405* (2013.01); *F15B 2201/4155* (2013.01); *F15B 2201/50* (2013.01); *F15B 2201/51* (2013.01); *F15B 2211/40515* (2013.01); *F15B 2211/6343* (2013.01); *F16F 9/00* (2013.01)

(58) Field of Classification Search
CPC .. F15B 1/24; F15B 2201/31; F15B 2201/405; F15B 2201/4155; F15B 2201/41; F15B 2211/40515; F16L 55/04; F16L 55/053; F16L 55/054; F16L 55/055
USPC ......... 138/31, 30; 137/209, 207, 207.5, 571; 92/134, 171.1, 249, 224, 255, 60
See application file for complete search history.

(56) References Cited

U.S. PATENT DOCUMENTS

| | | | | |
|---|---|---|---|---|
| 2,417,873 A | * | 3/1947 | Huber | F15B 1/24 138/31 |
| 2,703,108 A | * | 3/1955 | McCuistion | F15B 1/24 138/31 |
| 2,742,929 A | * | 4/1956 | Treseder | F15B 1/24 138/31 |
| RE24,223 E | * | 9/1956 | Ford et al. | F15B 1/24 138/31 |

(Continued)

FOREIGN PATENT DOCUMENTS

| | | |
|---|---|---|
| WO | WO 2011/159874 A2 | 12/2011 |
| WO | WO 2014/145018 A2 | 9/2014 |

*Primary Examiner* — Patrick F Brinson
(74) *Attorney, Agent, or Firm* — Wolf, Greenfield & Sacks, P.C.

(57) ABSTRACT

Presented herein are systems and methods that allow for adapting at least one dimension of an accumulator in a hydraulic system when faced with certain dimensional constraints and to vary the compliance or stiffness of an accumulator.

10 Claims, 4 Drawing Sheets

(56) References Cited

U.S. PATENT DOCUMENTS

| | | | | |
|---|---|---|---|---|
| 3,015,345 | A * | 1/1962 | Michael | F15B 1/24 |
| | | | | 138/31 |
| 3,364,950 | A * | 1/1968 | Zajdler | F16F 9/42 |
| | | | | 137/528 |
| 3,672,402 | A * | 6/1972 | Bloemer | F15B 1/02 |
| | | | | 138/31 |
| 8,899,270 | B2 * | 12/2014 | Engelberg | F15B 1/24 |
| | | | | 138/30 |
| 9,243,558 | B2 * | 1/2016 | Samara-Rubio | F15B 1/24 |
| 2010/0072760 | A1 | 3/2010 | Anderson et al. | |
| 2016/0333896 | A1 * | 11/2016 | Baltes | F15B 1/24 |

\* cited by examiner

ACCUMULATOR WITH SECONDARY GAS CHAMBER

CROSS-REFERENCE TO RELATED APPLICATIONS

This application claims priority under 35 U.S.C. 119(e) to U.S. provisional application Ser. No. 62/451,618, titled "ACCUMULATOR WITH SECONDARY GAS CHAMBER," filed Jan. 27, 2017 which is hereby incorporated by reference in its entirety.

FIELD

Disclosed embodiments are related to accumulators that include a main gas filled chamber and a secondary gas-filled chamber.

BACKGROUND

Hydraulic actuators or dampers are used to control motion in a variety of systems such as, for example, passive, semi-active, or active suspension systems. In some applications, a hydraulic system having a damper and/or actuator may additionally include an accumulator that is designed to receive and/or supply fluid to the damper or actuator. The accumulator may serve, for example, to accommodate variations in the fluid capacity of the damper or actuator, and/or to accommodate fluid expansion or contraction (e.g., due to thermal variations) during operation of the hydraulic system.

SUMMARY

In a hydraulic system having an accumulator, the accumulator's volume, stiffness, and/or compliance may significantly affect the behavior of the overall hydraulic system. In many space-sensitive applications (e.g., automotive applications), packaging constraints may limit the size available for the accumulator. Presented herein are systems and methods that allow for optimizing accumulator volumes, even when faced with constraints on one or more dimensions of the accumulator, such as for example, the length or diameter of the accumulator. Additionally or alternatively, systems may be configured to dynamically control a response (e.g., compliance, stiffness) of an accumulator in a hydraulic system.

In one embodiment, an accumulator includes a liquid-filled chamber; at least one port through which liquid may ingress and/or egress the liquid-filled chamber; a first gas-filled chamber; a moveable barrier separating the liquid-filled chamber from the first gas-filled chamber; a second gas-filled chamber; a first gas flow path that connects the first gas-filled chamber to the second gas-filled chamber.

In some embodiments, the accumulator may further comprise an inner cylindrical housing; an outer cylindrical housing, wherein at least a portion of the outer cylindrical housing encircles at least a portion of the inner cylindrical housing; wherein the liquid-filled chamber and the first gas-filled chamber are defined at least partially by an inner surface of the inner cylindrical housing; and wherein the second-gas filled chamber is defined at least partially by an inner surface of the outer cylindrical housing. In some embodiments, the second-gas filled chamber is defined at least partially by an outer surface of the inner cylindrical housing. In some embodiments, the outer cylindrical housing is arranged coaxially with respect to the inner cylindrical housing.

In some embodiments, the accumulator comprises a fluid restriction located along the first gas flow path. In some embodiments, a valve may be located along the first gas flow path (e.g., the valve may be fluidly disposed between the first gas-filled chamber and the second gas-filled chamber. In certain embodiments, the valve may be configured to vary a flow resistance of the first gas flow path. In certain embodiments, the valve is an electrically or electromechanically controlled valve.

Further disclosed is a method of operating an actuator having a liquid-filled chamber, a first gas-filled chamber, a second gas-filled chamber, and a first gas flow path that connects the first gas-filled chamber and the second gas-filled chamber. In certain embodiments, the method includes determining a pressure and/or a temperature of at least one of the first-gas filled chamber and liquid-filled chamber; and based on the determined pressure, adjusting the flow resistance of the first gas flow path. For example, if the determined pressure exceeds a first threshold pressure, the flow resistance of the first gas flow path may be decreased. Likewise, if the determined pressure falls below a second threshold pressure, the flow resistance of the first gas flow path may be increased. In certain embodiments, the valve may include a valve housing and an orifice therethrough, and adjusting the flow resistance of the first gas flow path may be achieved by reducing or enlarging an area of the orifice. In certain embodiments, adjusting the flow resistance of the first gas flow path may be achieved by at least partially opening the valve, for example electrically or by using pilot operated valve, to decrease flow resistance, and by at least partially closing the valve, for example electrically or by using pilot operated valve, to increase flow resistance.

It should be appreciated that the foregoing concepts and additional concepts discussed below may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF FIGURES

The accompanying figures are not intended to be to scale. In the figures, each identical or nearly identical component that is illustrated in the various figures may be represented by a like numeral. For purposes of clarity, not every component may be labeled in every figure. In the figures.

DETAILED DESCRIPTION

Upon extension or retraction of a hydraulic damper or actuator, the total volume of fluid contained within the damper or actuator may vary (e.g., due to insertion or removal of a piston rod into or from a housing of the damper or actuator). In semi-active or active vehicular suspension systems that utilize a hydraulic damper or actuator, an accumulator may therefore be utilized to accommodate these variations in total fluid volume within the damper or actuator housing. An accumulator may also be utilized in a variety of hydraulic systems, including but not limited to dampers and actuators, in order to accommodate thermal expansion or contraction of hydraulic fluid that occurs due to variations in ambient or operating temperatures.

In applications in which space may, for example, be limited (such as, for example, automotive applications), there may be constraints placed on the size (e.g., a length, a diameter) of an accumulator. As described herein, such constraints may undesirably affect or hinder the operation of the accumulator. Further, in certain applications, it may be advantageous to dynamically control or vary an observed compliance or stiffness of an accumulator. Presented herein are systems and methods that allow for optimizing accumulator volumes, even when faced with constraints on one or more dimensions, such as for example, the length or diameter of the accumulator, and/or that may allow for dynamically controlling an observed response (e.g., compliance, stiffness) of an accumulator in a hydraulic system.

Accumulators for hydraulic systems may be gas-charged accumulators that include a barrier (such as, for example, a floating piston, a bladder, or a flexible membrane) that separates a gas-filled chamber from a liquid-filled chamber. This barrier may be displaced as fluid enters the accumulator; this displacement, in turn, may lead to compression of the gas in the gas-filled chamber. As more fluid flows into the liquid-filled chamber, the gas-filled chamber becomes increasingly compressed, which may cause an observed stiffness of the accumulator to increase. In active suspension systems of a vehicle, an increase in stiffness of the accumulator may lead to an uncomfortable occupant experience. In order to accommodate sufficient quantities of liquid while remaining within a desirable stiffness range, the total fluid volume of a given accumulator (that is, the total volume of the liquid-filled chamber and any gas-filled chambers) may be considered and adjusted based on the requirement each specific application or desired operating characteristics. In general, the total fluid volume of an accumulator may be varied by changing a length of the accumulator and/or changing a diameter of the accumulator. However, as recognized by the Inventors, in certain applications (especially, for example, automotive applications), space constraints may limit at least one dimension of the accumulator, such as for example, the overall length and/or the diameter of the accumulator. These limits on one or more dimensions of an accumulator may result accumulator having a sub-optimal total gas chamber and/or liquid chamber volume. In addition, if the accumulator includes a piston, then increasing the diameter of the accumulator may require increasing the diameter of the piston, which may in turn increase the mass of the piston, potentially leading to higher inertial losses and/or loss of bandwidth over which the accumulator is able to function.

In view of the above, the Inventors have realized that there is a need for accumulators having increased fluid volumes, without requiring substantial increases to, for example, the length and/or diameter of the accumulators. Accordingly, in some embodiments, an accumulator may include a first accumulator housing that contains a liquid-filled chamber and a first gas-filled chamber. A barrier (e.g., a piston) may be disposed between the liquid-filled chamber and the first gas-filled chamber within the first accumulator housing. The accumulator may also include a second gas-filled chamber that is in fluid communication with the first gas-filled chamber. This second gas-filled chamber may be arranged and/or disposed along any desired length and/or position along or proximate to the accumulator body. The second gas-filled chamber may be contained within the first accumulator housing, or may be contained outside of the first accumulator housing (e.g., within a second accumulator housing). For example, in an embodiment, the first and second gas-filled chambers may be cylindrical with longitudinal axes that are parallel. However, one or more of the chambers may be of another shape and/or orientation as the disclosure is not so limited.

Additionally or alternatively, in some embodiments, at least a portion of the second gas-filled chamber may be coaxially located and at least partially encircle the first gas-filled chamber. In some embodiments, the accumulator may include an inner cylindrical housing and an outer cylindrical housing coaxially arranged. For example, the outer cylindrical housing may extend along at least a portion of the length of the inner cylinder. The first gas-filled chamber may be at least partially defined by an inner surface of the inner cylindrical housing. The second gas-filled chamber may be at least partially defined by an outer surface of the inner cylindrical housing and an inner surface of the outer cylindrical housing. In some embodiments, the first gas-filled chamber and second gas-filled chamber may be in fluid communication through one or more openings that pass through the inner cylindrical housing.

In addition to the above, the Inventors have recognized that it may be desirable to dynamically vary the compliance of an accumulator within a hydraulic system. In certain embodiments, a valve may be fluidly disposed in a flow path that connects the first gas-filled chamber to the second gas-filled chamber, such that a flow resistance of the flow path between the two chambers may be controlled. The valve may be a variable restriction valve and/or another appropriate valve or fixed restriction. The restriction may include an appropriately sized orifice and/or tube. In certain embodiments, the variable restriction valve and/or another appropriate valve may be capable of effectively blocking fluid communication between the first gas-filled chamber and the second gas-filled chamber. By varying the flow resistance between the two gas-filled chambers, the compliance and/or stiffness of the accumulator may be dynamically controlled. For instance, in some embodiments the flow resistance of the flow path between the first and second gas-filled chamber may be increased or decreased. Alternatively, the first gas-filled chamber may be fluidly isolated from the second gas-filled chamber at a desired combination of pressure and/or volume during operation of the accumulator.

In some embodiments, one or more pressure sensors may be used to determine the pressure of a liquid and/or gas in the liquid-filled chamber of the accumulator, in the first gas-filled chamber of the accumulator, and/or any other appropriate location in the system. Based on the determined fluid pressure, a flow restriction of a flow path between the first gas-filled chamber and the second-gas filled chamber or, in some embodiments, any other gas filled chamber may be adjusted. For example, if the fluid pressure of the first gas-filled chamber exceeds a first threshold value, the valve may be opened, so as to reduce the stiffness of the accumulator. Likewise, if the fluid pressure of the first gas-filled chamber falls below a second threshold value, the valve may be closed, so as to increase the stiffness of the accumulator. Alternatively, the valve may be controlled based on the position of the liquid/gas barrier (e.g., the floating piston) by sensing a position of the barrier relative to the first accumulator housing.

In certain embodiments, to allow for further control over properties or response of the accumulator, the accumulator may include one or more additional gas filled chamber such as a third gas-filled chamber. In these embodiments, a second valve (e.g., a variable restriction valve and/or another appropriate valve) may, for example, be fluidly disposed between the third gas-filled chamber and at least one of the first gas-filled chamber and the second gas-filled chamber.

The gas communication between one or more gas filled chambers may be direct or indirect and/or selective or continuous. Unless the context indicates otherwise, indirect gas communication shall mean gas exchange between two gas filled chambers that occurs at least partially via a third chamber. Unless the context indicates otherwise, selective gas communication shall mean fluid exchange between two chambers that is controlled by a valve or other variable restriction. Additionally or alternatively, direct gas communication may be restricted by one or more restrictions such as, for example, one or more orifices.

It should be understood that the above concepts may be combined or used separately as the disclosure is not so limited. For instance, an accumulator including first and second gas-filled chambers that are at least partially coextensive with one another may also include a valve (e.g., a variable restriction, an on/off solenoid valve and/or other type of valve) to control the exchange of gas between the two gas-filled chambers. Further, two or more gas-filled chambers may share a common accumulator housing, although embodiments in which the two gas-filled chambers are removed from one another and/or integrated into separate housings are also contemplated as the disclosure is not so limited. Additionally or alternatively, one or more gas filled chambers may share a common housing with a liquid filled chamber as the disclosure is not so limited.

Turning now to the figures, several non-limiting embodiments are described in further detail. However, it should be understood that the various components, features, and methods of operation described in relation to the different embodiments may be used in any appropriate combination as the disclosure is not limited to only those specific embodiments described herein.

Figure 1:
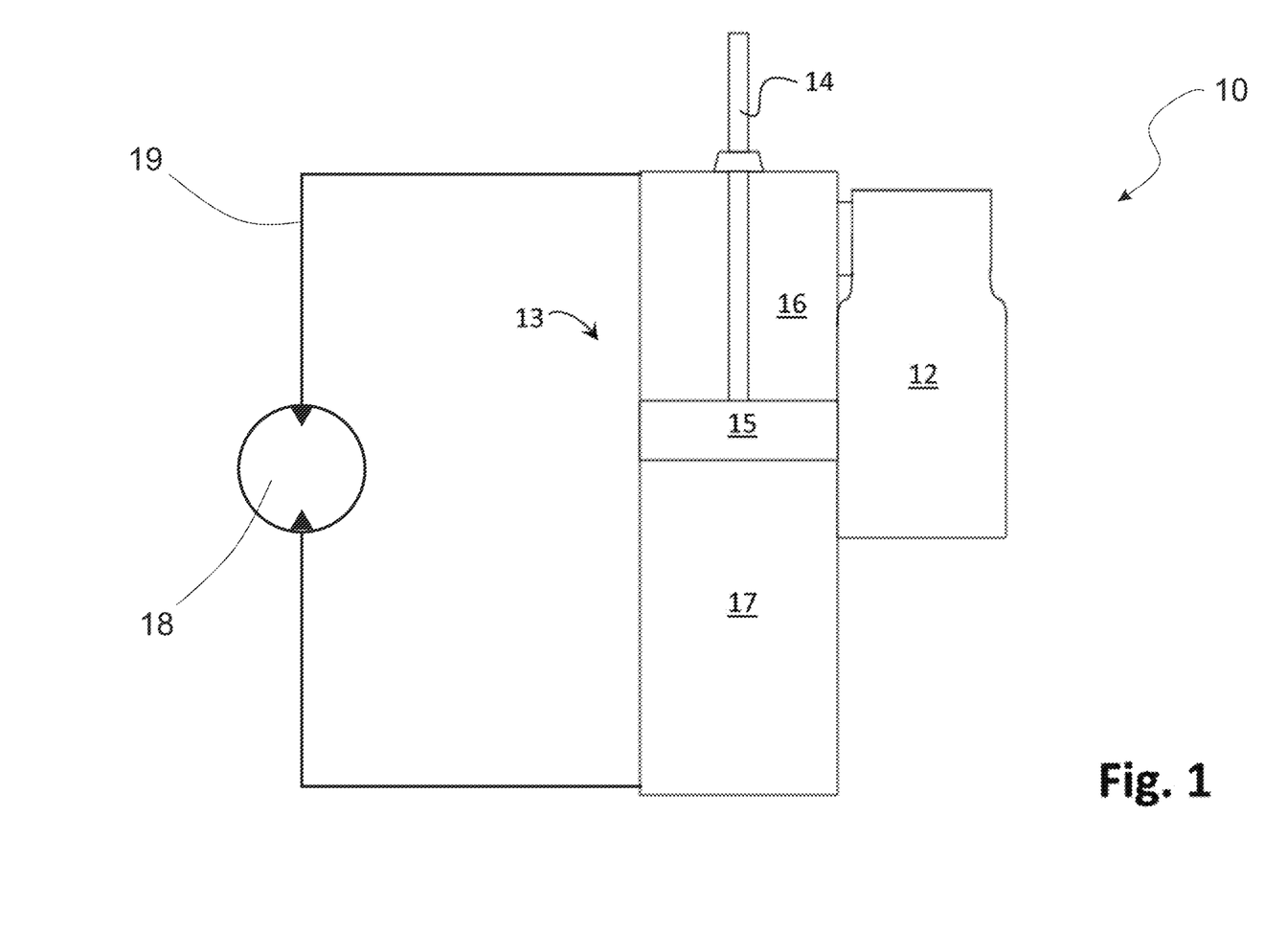
FIG. 1 illustrates a gas-charged accumulator fixedly attached to the housing of a hydraulic actuator.

FIG. 1 depicts an embodiment of a hydraulic system 10 that includes a gas-charged accumulator and a hydraulic damper or actuator 13. In the illustrated embodiment, the gas-charged accumulator may include an accumulator housing 12 that contains a floating piston separating a gas-filled chamber from a liquid-filled chamber. The floating piston may be arranged to move (e.g., to slide) within the accumulator housing, thereby varying the volume of the gas-filled chamber and the volume of the liquid-filled chamber. In some embodiments, the piston may be a round disc that is received in an interior cylindrical portion of the accumulator housing 12.

In some embodiments, the accumulator housing 12 may be rigidly coupled to a housing of the hydraulic damper or actuator 13. The housing of the hydraulic damper or actuator 13 may contain one or more volumes (e.g., a compression volume 17 or an extension volume 16) that are at least partially filled with a hydraulic fluid.

In certain embodiments, actuator 13 may be used in an active suspension system of a vehicle to control the relative motion between a sprung mass (e.g. the vehicle body) and an unsprung mass (e.g. a wheel assembly). In such an embodiment, fluid flow path 19 between the compression volume and the extension volume may include a hydraulic device 18. In certain embodiments the hydraulic device may be back-drivable. The hydraulic device may be, for example, a hydraulic pump, a hydraulic motor, a hydraulic pump that may be operated as a hydraulic motor, or a hydraulic motor that may be operated as a hydraulic pump. The hydraulic device 18 may be operatively coupled to an electric machine (not shown). The electric machine may be an electric generator, an electric motor, an electric motor that may be operated as an electric generator, or an electric generator that may be operated as an electric motor.

The liquid-filled chamber of the accumulator may be in fluid communication with at least one of the one or more volumes 16, 17 contained within the housing of the hydraulic damper or actuator 13. In the embodiment of FIG. 1, the accumulator 12 is in fluid communication with the extension volume 16 of the hydraulic damper or actuator 13. In other embodiments, the accumulator housing 12 may be in fluid communication with the compression volume 17, as the present disclosure is not so limited.

The hydraulic damper or actuator may also include a piston 5 slidably received in the interior of the housing of the hydraulic damper or actuator 13, and a piston rod 14 may be attached to one side of the piston 15. During compression of the hydraulic damper or actuator 13, an increasing portion of the piston rod 14 may be inserted into the housing of the hydraulic damper or actuator 13, thereby displacing a quantity of hydraulic fluid contained within the housing. In certain embodiments, at least a portion of the displaced hydraulic fluid may enter the liquid-filled chamber of the accumulator 12.

In some embodiments, the accumulator 12 may be cylindrical and include a first gas-filled chamber. Further, in some embodiments the gas contained within the first gas-filled chamber may be pre-charged to a pressure that may be selected to, for example, avoid cavitation in the hydraulic system and/or apply a baseline extension force. The baseline extension force may be equal to the pre-charge pressure multiplied by the difference in area of the piston face exposed to fluid in the compression volume and the piston face exposed to fluid in the extension volume. While the pre-charged pressure may be any appropriate value depending on the particular application, in some embodiments, the pressure may be between 100 psi and 1,000 psi. Of course, pre-charge pressure both greater and lower than those noted above, as well as the use of no pre-charged pressure, are also contemplated as the disclosure is not so limited.

Figure 2:
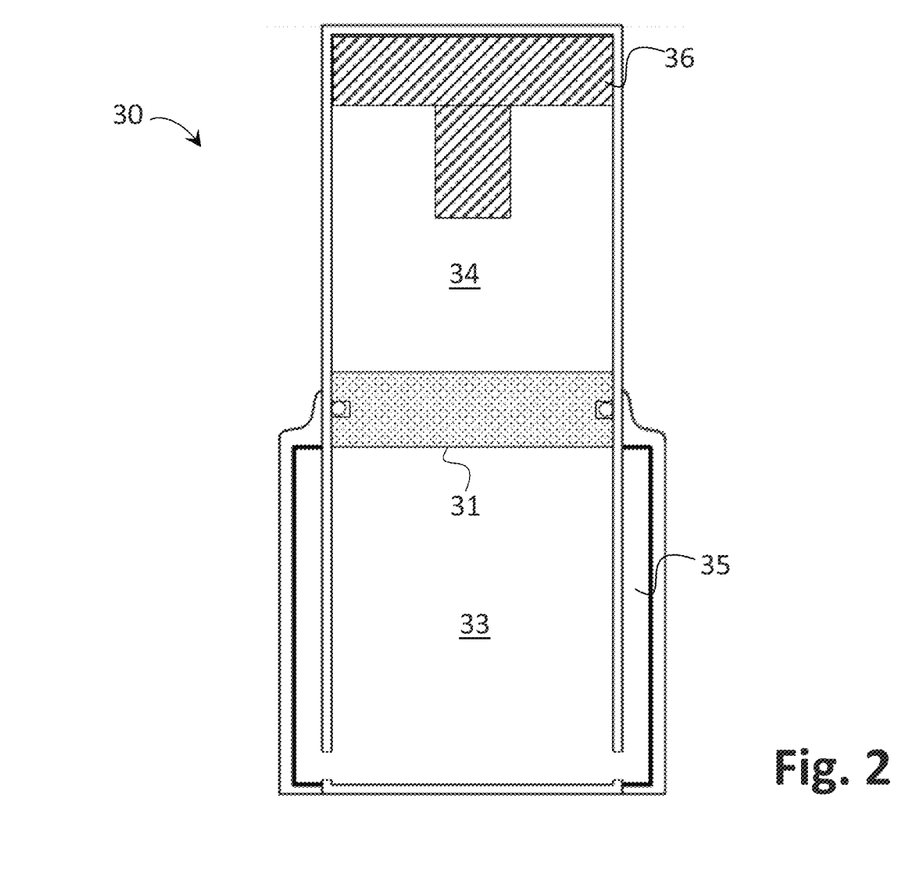
FIG. 2 illustrates the accumulator of FIG. 1 in section.

FIG. 2 depicts a cross section of one embodiment of an accumulator 30 that includes an annular second gas-filled chamber 35 arranged coaxially with the first gas-filled chamber 33. In the depicted embodiment, the gas charged accumulator 30 includes an accumulator housing that contains three chambers. The first chamber is a liquid-filled chamber 34 which contains a quantity of liquid such as a hydraulic fluid that may be in fluid communication with, for example, a volume in the hydraulic actuator 10 in FIG. 1. The first gas-filled chamber 33 is in fluid communication with the annular gas-filled chamber 35. In certain embodiments, at least a portion of the annular gas-filled chamber surrounds at least a portion of the first gas chamber. It is noted that the chambers may be of any convenient and appropriate shape and relative orientation as the disclosure is not so limited. //The embodiment in FIG. 2 further depicts a floating piston 31 that has two opposing faces, where a first face is acted on by the liquid in chamber 34, and the second opposing face is acted on by the gas in chamber 33. The floating piston 31 may include a seal that isolates the gas-filled chamber 33 from the liquid-filled chamber 34 and effectively prevents leakage of gas or fluid into either chamber.

The floating piston 31 may slide in a cylindrical portion of the accumulator. The total piston travel distance depends on the volume of fluid accepted in the fluid chamber 34. As the fluid volume in the liquid-filled chamber 34 increases, the floating piston 31 will be displaced so as to decrease fluid volume in the gas-filled chamber 33. Alternatively, as the fluid volume in the liquid-filled chamber 34 decreases, the floating piston will be displaced so as to increase fluid volume in the gas-filled chamber 33.

The gas-filled chamber 33 may also be in fluid communication with the coaxial auxiliary gas-filled chamber 35, so that the floating piston compresses the gas in both the gas-filled chamber 33 and coaxial gas-filled chamber 35.

In the embodiment depicted in FIG. 2, a piston stop 36 may be used to limit the travel of the floating piston 31 in the fluid chamber 34.

Figure 3:
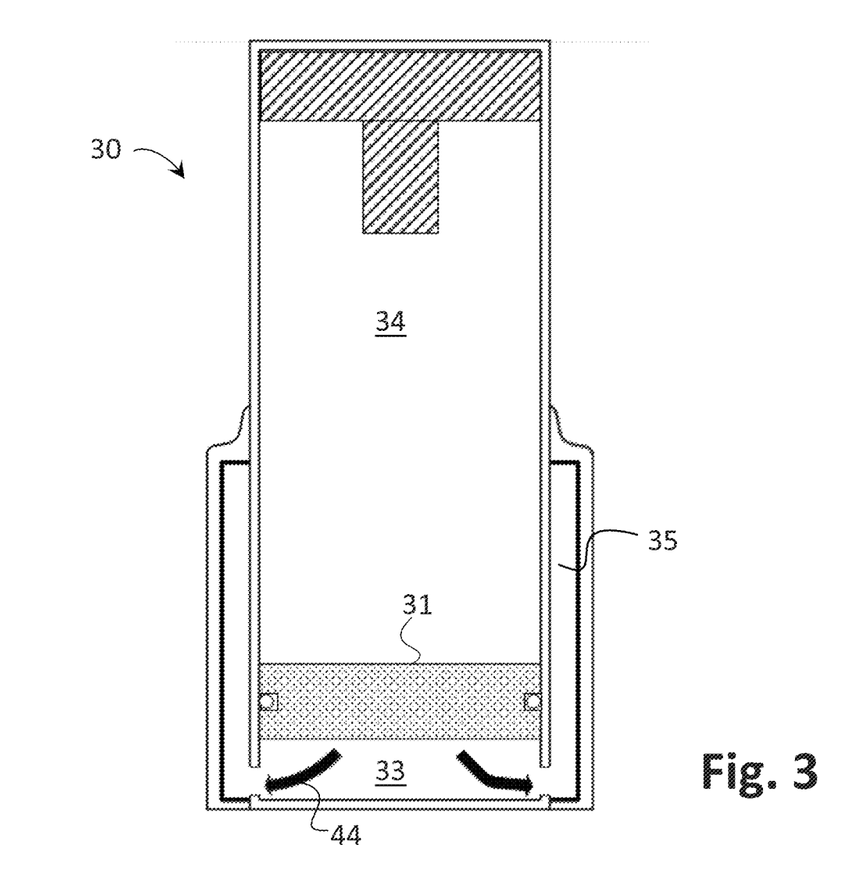
FIG. 3 illustrates the section view of FIG. 2 with the flow of gas indicated.

FIG. 3 depicts the accumulator 30 of FIG. 2 with an increased quantity of fluid contained in the liquid-filled chamber 34. As a result of the increase in volume of the liquid-filled chamber, the floating piston 31 may be displaced so as to reduce the volume of the first gas-filled chamber 33. In turn, gas may flow from the first gas-filled chamber 33 and into the annular second gas-filled chamber 35. The flow direction arrows 44 depict the flow of gas from the first gas-filled chamber 33 to the annular gas-filled chamber 35 as the piston is moved to accept additional hydraulic fluid into liquid-filled chamber of the accumulator.

Figure 4:
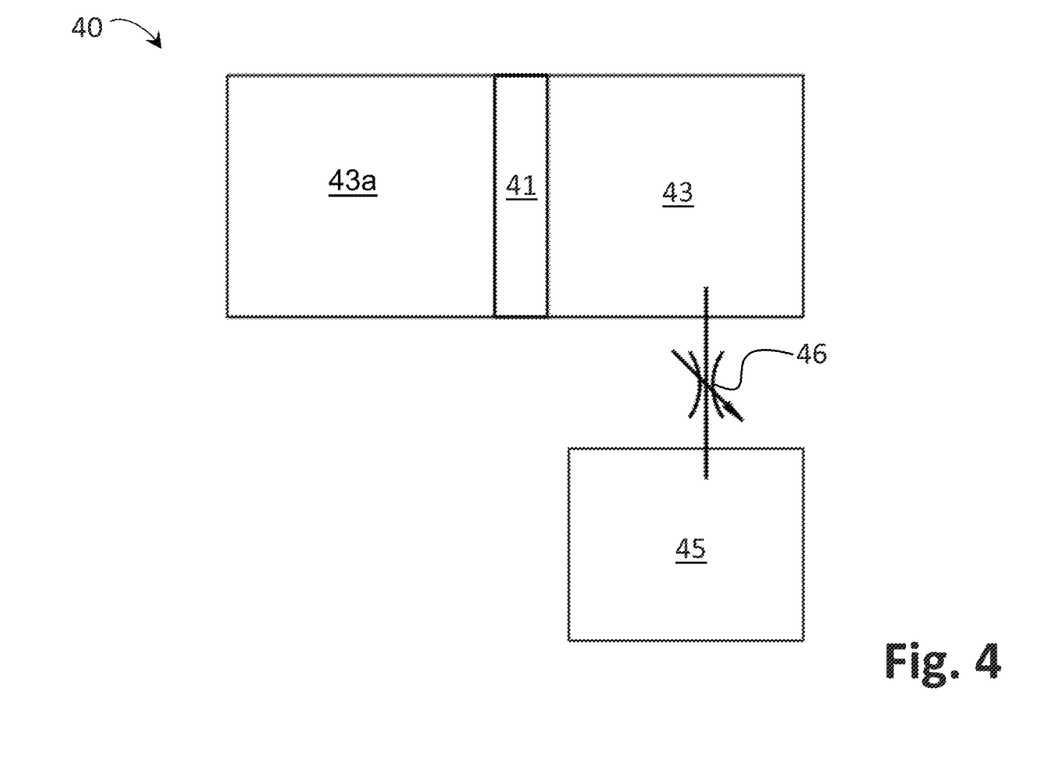
FIG. 4 is a schematic representation of the accumulator of FIG. 3 with a variable restriction valve between a first gas-filled chamber and a second gas-filled chamber

FIG. 4 illustrates another embodiment of an accumulator 40 that includes a liquid-filled chamber 43a, a first gas-filled chamber 43, a floating piston 41 that separates the liquid filled chamber from the first gas-filled chamber 43, a second gas-filled chamber 45, and a restriction 46, (e.g. a controllable valve) disposed along a flow path that connects the first gas-filled chamber 43 to the second gas-filled chamber 45. The accumulator may also include a port (not shown) through which liquid may ingress and egress the liquid-filled chamber. The restriction 46 may be a variable restriction valve or variable orifice valve, such as, for example, an active valve, which may be, for example, an electrically or electromechanically controlled valve (e.g., a solenoid valve). In various embodiments, the valve may be, for example, a butterfly valve, a sleeve valve, a plug valve, a pneumatically actuating valve, a hydraulically actuated valve, a float-type valve, a ball valve, a gate valve.

The restriction 46 may be used to control or restrict the flow of gas between the first gas-filled chamber 43 and the second gas-filled chamber 45 by changing a flow resistance and/or selectively closing the flow path between the first and second gas-filled chambers. By varying the flow resistance and/or selectively blocking flow along the flow path connecting the first gas-filled chamber and the second gas-filled chamber, the compliance or stiffness of the accumulator 40 may be dynamically controlled. For example, a range of compliances may be achieved by isolating the first gas-filled chamber 43 from the second-gas filled chamber 45 when piston 41 is at an appropriate point in its stroke. For example, if the first gas-filled chamber 43 is isolated from the second gas-filled chamber 45 by the restriction 46 when the volume of the first gas-filled chamber 43 is large, the accumulator 40 will be less stiff than if the first gas-filled chamber 43 is isolated when its volume is smaller.

In another embodiment of the accumulator 40, a third gas-filled chamber (not shown), or any other number of additional gas-filled chambers, may be included and placed in selective fluid communication with the first gas-filled chamber 43 and/or the second gas-filled chamber 45. Another valve (not shown) may be placed on a second flow path that connects the third gas-filled chamber to at least one of the first gas-filled chamber 43 and the second gas-filled chamber 45, in order to control or restrict the flow of gas between the first gas-filled chamber 43 or second gas-filled chamber 45 and the third gas-filled chamber. Controlling or restricting the flow of gas between the first gas-filled chamber 43 and the second and/or the third gas-filled chamber may be used to change the compliance of the accumulator over ranges that may not be attainable when only two gas-filled chambers are included in the system.

The invention claimed is:

1. An accumulator of a hydraulic active suspension system, comprising:
a first liquid-filled volume in fluid communication with a compression volume or an extension volume of a hydraulic actuator of the active suspension system;
a flow path through which liquid may be exchanged between the first liquid-filled volume and the compression volume or the extension volume of the hydraulic actuator;
a first gas-filled chamber;
a moveable barrier separating the first liquid-filled volume from the first gas-filled chamber;
a second gas-filled chamber; and
a first gas flow path that connects the first gas-filled chamber to the second gas-filled chamber.

2. The accumulator of claim 1, further comprising:
an inner cylindrical housing;
an outer cylindrical housing, wherein at least a portion of the outer cylindrical housing encircles at least a portion of the inner cylindrical housing;
wherein the first liquid-filled volume and the first gas-filled chamber are defined at least partially by an inner surface of the inner cylindrical housing; and
wherein the second-gas filled chamber is defined at least partially by an inner surface of the outer cylindrical housing.

3. The accumulator of claim 2, wherein the second-gas filled chamber is defined at least partially by an outer surface of the inner cylindrical housing.

4. The accumulator of claim 2, wherein the outer cylindrical housing is arranged coaxially with respect to the inner cylindrical housing.

5. The accumulator of claim 1, further comprising a fluid restriction located along the first gas flow path.

6. The accumulator of claim 1, wherein the restriction is a valve.

7. The accumulator of claim 6, wherein the valve is configured to vary flow resistance of the first gas flow path.

8. The accumulator of claim 7, wherein the valve is an electrically or electromechanically controlled valve.

9. The accumulator of claim 1, wherein the accumulator comprises an accumulator housing rigidly coupled to a housing of the hydraulic actuator.

10. The accumulator of claim 2, wherein the outer cylindrical housing is an accumulator housing that is rigidly coupled to a housing of the hydraulic actuator.

* * * * *

UNITED STATES PATENT AND TRADEMARK OFFICE
CERTIFICATE OF CORRECTION

PATENT NO. : 10,480,552 B2
APPLICATION NO. : 15/881165
DATED : November 19, 2019
INVENTOR(S) : Clive Tucker et al.

Page 1 of 1

It is certified that error appears in the above-identified patent and that said Letters Patent is hereby corrected as shown below:

In the Claims

At Column 8, Line 50, Claim 6, please delete "claim 1," and replace with -- claim 5, --

Signed and Sealed this
Fourteenth Day of January, 2020

Andrei Iancu
*Director of the United States Patent and Trademark Office*